(12) United States Patent
Wu et al.

(10) Patent No.: US 8,019,748 B1
(45) Date of Patent: Sep. 13, 2011

(54) WEB SEARCH REFINEMENT

(75) Inventors: Jun Wu, Saratoga, CA (US); Hang Cui, Tianjin (CN); Hangjun Ye, Beijing (CN)

(73) Assignee: Google Inc., Mountain View, CA (US)

( * ) Notice: Subject to any disclaimer, the term of this patent is extended or adjusted under 35 U.S.C. 154(b) by 276 days.

(21) Appl. No.: 11/940,079

(22) Filed: Nov. 14, 2007

(51) Int. Cl.
G06F 17/30 (2006.01)

(52) U.S. Cl. ........................................................ 707/713

(58) Field of Classification Search .................. 707/3, 4, 707/6, 713; 704/7
See application file for complete search history.

(56) References Cited

U.S. PATENT DOCUMENTS

| | | | |
|---|---|---|---|
| 5,265,065 A | 11/1993 | Turtle | |
| 5,331,554 A | 7/1994 | Graham | |
| 5,418,948 A | 5/1995 | Turtle | |
| 6,006,221 A | 12/1999 | Liddy et al. | |
| 6,006,225 A | 12/1999 | Bowman et al. | |
| 6,131,082 A * | 10/2000 | Hargrave et al. | 704/7 |
| 6,169,986 B1 | 1/2001 | Bowman et al. | |
| 6,182,066 B1 | 1/2001 | Marques | |
| 6,314,419 B1 | 11/2001 | Faisal | |
| 6,345,244 B1 | 2/2002 | Clark | |
| 6,571,234 B1 | 5/2003 | Knight et al. | |
| 6,611,825 B1 | 8/2003 | Billheimer et al. | |
| 6,633,868 B1 | 10/2003 | Min et al. | |
| 6,757,646 B2 | 6/2004 | Marchisio | |
| 6,882,970 B1 | 4/2005 | Garner et al. | |
| 7,054,812 B2 | 5/2006 | Charlesworth et al. | |
| 7,089,236 B1 | 8/2006 | Stibel | |
| 7,593,921 B2 * | 9/2009 | Goronzy et al. | 707/3 |
| 2002/0052740 A1 | 5/2002 | Charlesworth et al. | |
| 2002/0052894 A1 | 5/2002 | Bourdoncle et al. | |
| 2002/0156763 A1 | 10/2002 | Marchisio | |
| 2003/0101177 A1 * | 5/2003 | Matsubayashi et al. | 707/6 |
| 2003/0149704 A1 * | 8/2003 | Yayoi et al. | 707/102 |
| 2003/0208473 A1 | 11/2003 | Lennon | |
| 2003/0217052 A1 | 11/2003 | Rubenczyk et al. | |
| 2003/0231209 A1 | 12/2003 | Kappe et al. | |

(Continued)

FOREIGN PATENT DOCUMENTS

EP   1 587 011   10/2005

(Continued)

OTHER PUBLICATIONS

Huang, et al., "Relevant Term Suggestion in Interactive Web Search Based on Contextual Information in Query Session Logs," Journal of the American Society for Information Science and Technology, 2003, 54(7):638-649.

(Continued)

*Primary Examiner* — Etienne P LeRoux
(74) *Attorney, Agent, or Firm* — Fish & Richardson P.C.

(57) ABSTRACT

Similar queries are identified so that suggested search queries may be provided to a user. A first search query having at least one term associated with a semantic weight is received. A second query having at least one term associated with a semantic weight is received. A first vector is generated based on the first query and the at least one semantic weight of the first query, and a second vector is generated based on the second query and the at least one semantic weight of the second query. A similarity measurement between the first and second search queries is made based at least in part on a comparison of the first vector to the second vector.

19 Claims, 6 Drawing Sheets

U.S. PATENT DOCUMENTS

| | | |
|---|---|---|
| 2004/0086185 A1 | 5/2004 | Sun |
| 2004/0158560 A1 | 8/2004 | Wen et al. |
| 2005/0021517 A1 | 1/2005 | Marchisio |
| 2005/0076003 A1 | 4/2005 | DuBose et al. |
| 2005/0234879 A1 | 10/2005 | Zeng et al. |
| 2005/0234972 A1 | 10/2005 | Zeng et al. |
| 2005/0289463 A1 | 12/2005 | Wu et al. |
| 2006/0106769 A1 | 5/2006 | Gibbs |
| 2006/0112091 A1 | 5/2006 | Chapman et al. |
| 2006/0200556 A1 | 9/2006 | Brave et al. |
| 2006/0253427 A1 | 11/2006 | Wu et al. |
| 2008/0040314 A1 | 2/2008 | Brave et al. |
| 2008/0183685 A1* | 7/2008 | He et al. .............................. 707/4 |
| 2008/0195601 A1 | 8/2008 | Ntoulas et al. |

FOREIGN PATENT DOCUMENTS

| | | |
|---|---|---|
| WO | WO 00/79436 | 12/2004 |
| WO | WO 2005/026989 | 3/2005 |

OTHER PUBLICATIONS

Kim, et al, "A Comparison of Collocation-based Similarity Measures in Query Expansion," Information Processing and Management, Jan. 1999, 35:19-30.

Kou, et al, "Similarity Model and Term Association for Document Categorization," IEEE Proceedings of the 13$^{th}$ International Workshop on Database and Expert Systems Applications, 2002, 5 pages.

Qiu, et al., "Concept Based Query Expansion", SIGIR Forum, ACM, New York, NY, US, Jun. 27, 1993, pp. 160-169.

Wen, et al., "Query Clustering Using User Logs," 2002, ACM Transactions on Information Systems, Jan. 2002, 20(1):59-81.

Wenxiang et al., "Knowledge Discovery of Usage for Chinese Words Based on DSMA", Computer Applications and Software, 22(1):90-92, Jan. 2005 (English Abstract).

Yeung, et al, Improving Performance of Similarity-Based Clustering by Feature Weight Learning, IEEE Transactions on Pattern Analysis and Machine Intelligence, Apr. 2002, 24(4):556-561.

Notification of the First Office Action for Chinese Application Serial No. 200680021940.2, dated Nov. 13, 2009, 14 pages. (English translation included).

C. Dumitrescu, International Search Report in PCT/US2006/016787, mailed Aug. 24, 2006, 5 pages.

B. Giff-Schmitt, International Preliminary Report on Patentability in PCT/US2006/016787, mailed Nov. 6, 2007, 6 pages.

Chinese Examiner Wen Zhang, Notification of the Second Office Action for Chinese Application Serial No. 200680021940.2, dated Jul. 5, 2010, 9 pages. (English translation included).

\* cited by examiner

WEB SEARCH REFINEMENT

FIELD

This specification relates to user search queries, and providing refinements based on the same.

BACKGROUND

Computer databases now serve as storehouses for diverse types of information in a variety of forms of content including documents, images, audio files, videos, and practically any other type of content capable of being transferred to a digital format. The interconnected nature of today's computing environment offers the capability for users to have nearly instant access to this information regardless of their physical location.

Search interfaces serve as gateways to the vast information stored in these databases, but due to the tremendous amount and diverse types of digital data that is now accessible, searching for a broad category of data or mere keyword searching of these data stores can return an unmanageable number of results. The particular data being sought by the searcher can be obscured by a cumbersomely large result set, limiting the usefulness and efficiently of the search.

To assist the searcher in retrieving sought after data, a search interface can offer refinement options, such as suggested search queries based on the searcher's original input. Even though methods such as clustering similar search queries and matching those clusters may increase the coverage of search suggestion, they may fail to create specific suggestions for each query since the suggestions are the same for all queries in the cluster. Additionally, other methods that provide suggestions based on partial queries tend to sacrifice relevancy between original queries and their suggested queries.

SUMMARY

This specification describes search query refinement, including the suggesting of search queries by search engines based on users' original inputs and historical query logs. Search query refinement according to the present disclosure increases search query suggestion coverage (i.e., the number of other relevant search queries) while increasing the likelihood that a suggested query is identified that will result in a user selection. The similarity of two queries is based on their N-grams, which are weighted according to their semantic importance in queries.

In general, one aspect of the subject matter described in this specification can be embodied in methods that include that include the actions of receiving a first query, the first query having at least one term associated with a first semantic weight, receiving a second query, the second query having at least one term associated with a second semantic weight; and generating a first vector based on the first query and the first semantic weight. The methods further include generating a second vector based on the second query and the second semantic weight, and determining a similarity measurement between the first query and the second query based at least in part on a comparison of the first vector to the second vector. Other embodiments of this aspect include corresponding systems, apparatus, and computer program products.

These an other embodiments can optionally include one or more of the following features. The method can include assigning the first semantic weight based at least in part on an inverse document frequency (IDF) of the at least one term of the first query. The first semantic weight can be assigned based at least in part on an entropy of the at least one term of the first query. The entropy of the at least one term of the first query can be estimated from a list of search queries. Further, the method can include assigning the first semantic weight based at least in part on a combination of an inverse document frequency (IDF) of the at least one term of the first query and an entropy of the at least one term of the first query. The similarity measurement can be compared to a threshold. The first and second query can be identified as similar when the similarity measurement exceeds the threshold.

Determining a similarity measurement between the first query and the second query can include calculating a weighted sum of similarities between the at least one term of the first query and the at least one term of the second query. Additionally, the method can include retrieving at least one of the first semantic weight and the second semantic weight from a semantic importance log.

Particular embodiments of the subject matter described in this specification can be implemented so as to realize one or more of the following advantages. A search query suggestion can be generated based on a user-input search query. A query suggestion can also be based on historical query logs and can identify queries that typically follow a user-input search query The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
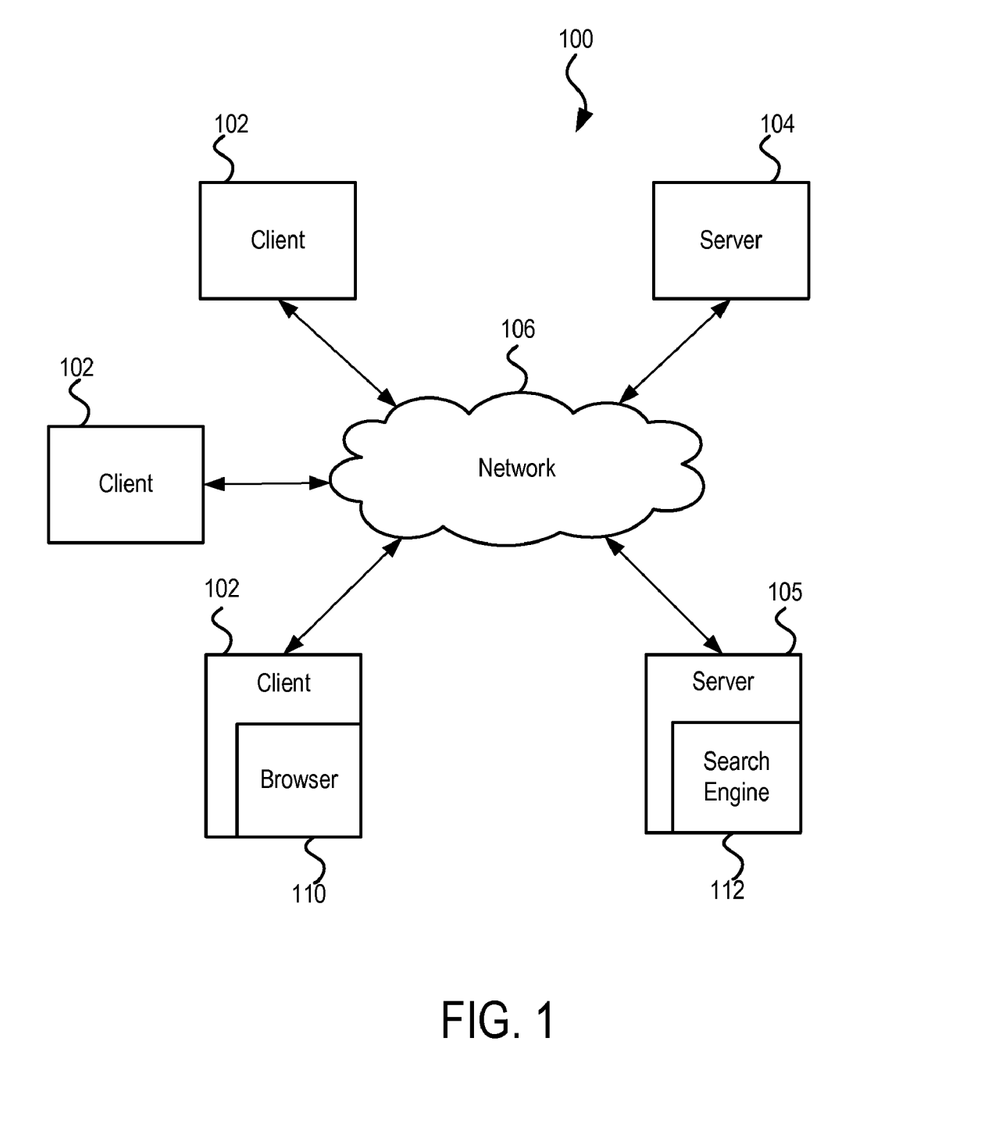
FIG. 1 shows an example search system.

FIG. 1 shows an example search system 100. The system 100 may include multiple client devices 102 connected to multiple servers 104, 105 over a network 106. The client devices 102 can include a web browser 110 for accepting user input, and for displaying information that has been received from other systems 102, 104, 105 over network 106. The servers 104, 105 may include a search engine 112 for accepting user search queries transmitted over the network 106, searching a database of documents, and returning results to the user. The network 106 may include a local area network (LAN), a wide area network (WAN), a virtual private network (VPN), a telephone network, such as the Public Switched Telephone Network (PSTN), an intranet, the Internet, or a combination of networks. For the sake of illustration, FIG. 1 shows three client devices 102 and two servers 104, 105 connected to a network 106; however, it will be appreciated that in practice there may be more or fewer client devices, servers, and/or networks, and that some client devices may also perform the functions of a server, and some servers may perform the functions of a client.

Figure 2:
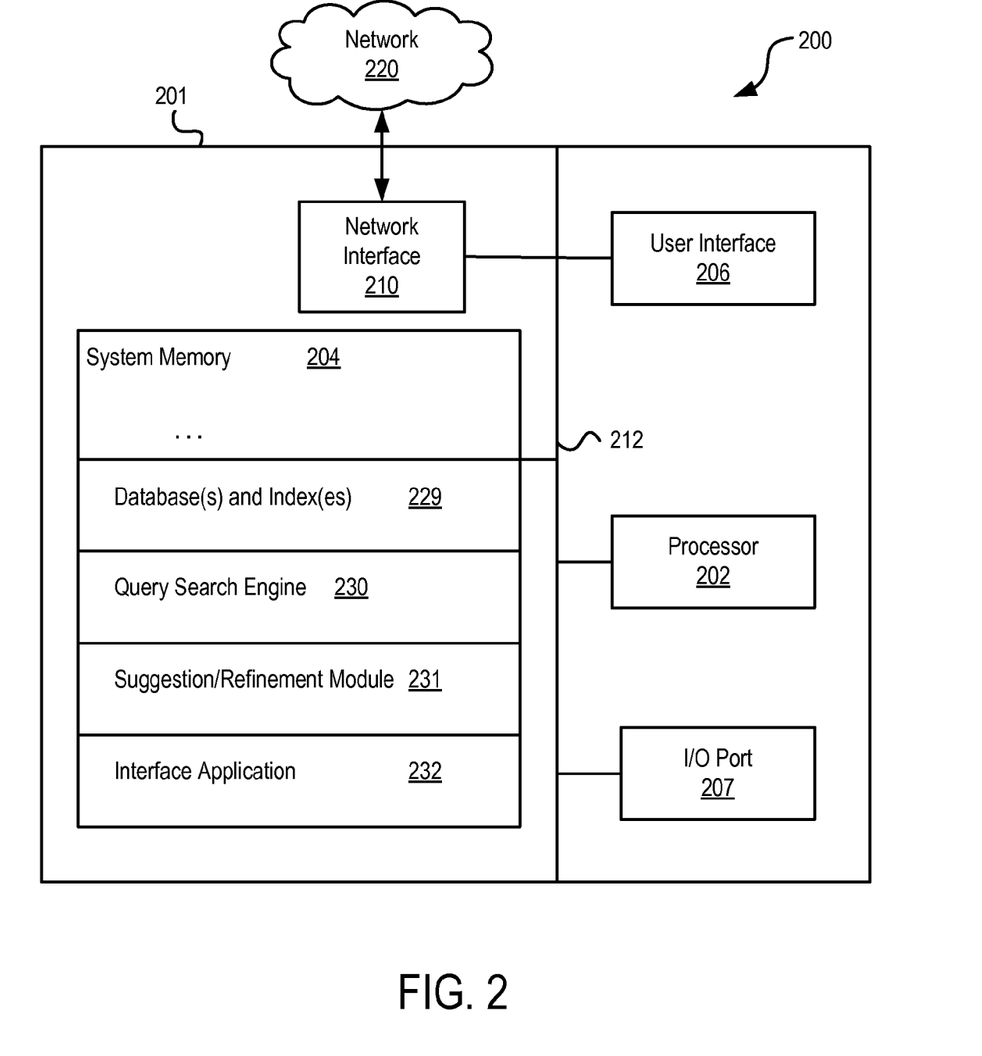
FIG. 2 shows another example search system.

FIG. 2 shows another example search system 200. In some implementations, system 200 includes a computing device 201 such as a personal computer, server, laptop, mainframe, personal digital assistant, cellular telephone, and/or the like. The system 200 also includes a processor 202, memory 204, a user interface 206, an input/output port 207, a network interface 210, and a bus 212 for connecting the aforementioned elements.

The operation of system 200 can be controlled by the processor 202 operating under the guidance of programs stored in the memory 204. The memory 204 may generally include some combination of computer readable media, such as high-speed random-access memory (RAM) and non-volatile memory such as read-only memory (ROM), a magnetic disk, disk array, and/or tape array. The I/O port 207 may include a disk drive or memory slot for accepting computer-readable media such as floppy diskettes, CD-ROMs, DVDs, memory cards, magnetic tapes, or the like. The user interface 206 may, for example, include a keyboard, mouse, pen, or voice recognition mechanism for entering information, and one or more mechanisms such as a display, printer, speaker, and/or the like for presenting information to a user. The network interface 210 is operable to provide a connection between system 200 and other systems (and/or networks 220) over a wired, wireless, optical, and/or other connection.

The system 200 may perform a variety of search and retrieval operations. These operations may be performed in response to processor 202 executing software instructions contained on a computer readable medium such as memory 204. The software instructions may be read into the memory 204 from another computer-readable medium, such as over the I/o Port 207, or from another device over the communication interface 210. As shown in FIG. 2, the memory 204 may include a variety of programs or modules for controlling the operation of the system 200 and performing the search and retrieval techniques described in more detail below. Although illustrated as within the system memory 204, these components can also be implemented at least in part in hardware, or a combination of hardware and/or software.

In some implementations, the computer 201 may correspond to the server 105 shown in FIG. 1. The memory 204 may include one or more databases of documents and indexes 229. The memory 204 may also include a search engine 230 for searching the one or more databases 229 using a query received from user interface 206 and/or received remotely from a user over network 220. As shown in FIG. 2, the memory 204 may also include a suggestion/refinement module 231 for suggesting and/or refining queries using the methods described in more detail below. The memory can also include a user-interface application 232 for operating the user interface 206 and/or for serving user interface web pages to remote users over network 220.

Although FIG. 2 illustrates a system that is primarily software-based, it will be appreciated that in other implementations special-purpose circuitry may be used in place of, or in combination with, software instructions to implement processes consistent with the present disclosure. Thus, the present disclosure is not limited to any specific combination of hardware and software.

It should be appreciated that the systems and methods of the present disclosure can be practiced with devices and/or architectures that lack some of the components shown in FIGS. 1 and 2 and/or that have other components that are not shown. Thus, it should be appreciated that FIGS. 1 and 2 are provided for purposes of illustration and not limitation as to the scope of the disclosure. For example, it should be appreciated that while, for purposes of illustration, the system 200 is depicted as a single, general-purpose computing device such as a personal computer or a network server, in other implementations the system 200 could include one or more such systems operating together using distributed computing techniques. In such implementations, some or all of the components and functionality depicted in FIG. 2 could be spread amongst multiple systems at multiple locations and/or operated by multiple parties. For example, the suggestion/refinement module 231 could be implemented on a system that is separate from the system 200 in which the databases and indexes 229 are hosted. It will be readily apparent that many similar variations could be made to the illustrations shown in FIGS. 1 and 2 without departing from the principles of the present disclosure.

As previously indicated, the systems shown in FIGS. 1 and 2 can be used to facilitate the retrieval of documents (e.g., web pages) responsive to user search queries. In some implementations, an index of documents and associated terms (e.g., search terms) may be used by the search engine 239 to provide search results in response to a query. The search engine 230 can receive a query and use the index to determine which documents correspond to that query. For example, Boolean logic can be used to match a query with documents, or a term frequency-inverse document frequency (TF-IDF) based information retrieval score could be used, with the words in the query combined with the words in each document. Thus, for example, if the query were "Guggenheim," search engine 230 could use an index to determine that the word "Guggenheim" appears in the text of select documents included in a corpus of documents.

When a search is limited to identifying documents using only an index of query terms identified within documents, the search may fail to identify documents that fail to include the exact user-provided query terms. The systems shown in FIGS. 1 and 2 therefore provide the ability to generate and execute suggested and/or refined queries based on an original user query and historical query logs.

Figure 3:
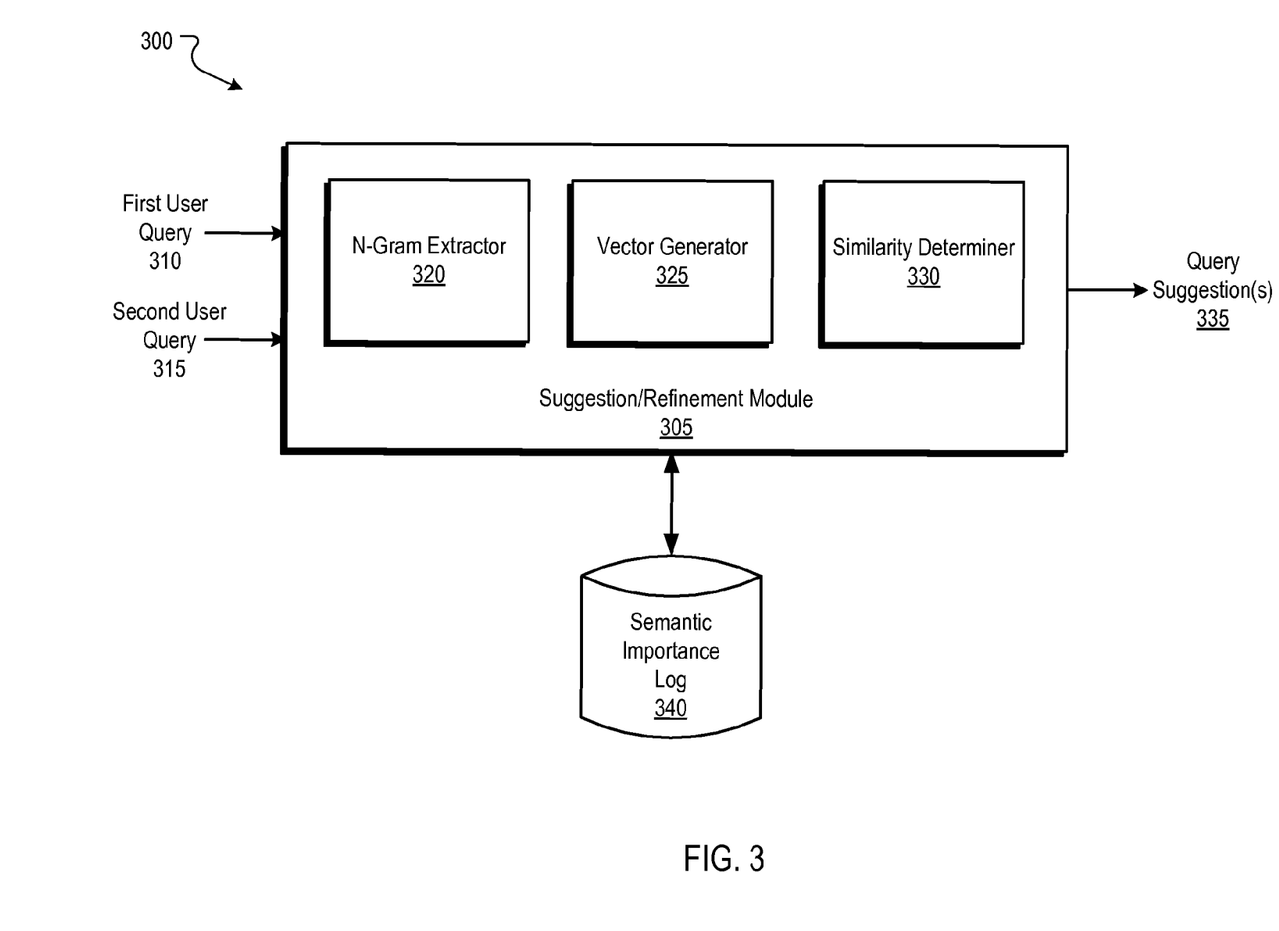
FIG. 3 shows an example system for generating query suggestions.

FIG. 3 is a block diagram of an example query suggestion system 300, which may be included within, or exemplary of, the system 200 described with respect to FIGS. 1 and 2. The system 300 generates query suggestions based on a comparison of two or more queries, such as a first user query 310 and a second user query 315. For example, a first user query may be compared to one or more previously-entered, stored user queries to identify similar queries that may return documents that are pertinent to the first user query. The system 300 shown in FIG. 3 generally includes a suggestion/refinement module 305, such as the suggestion/refinement module 231 of FIG. 2, and a semantic importance log 340, which can be contained within the database(es) and index(es) 229 of FIG. 2. The suggestion/refinement module 305 includes an N-gram extractor 320, a vector generator 325, and a similarity determiner 330.

The N-gram extractor 320 is operable to generate N-grams from each of the first user query 310 and the second user query 315. An N-gram is a subset of 'N' words and/or word combinations selected from a given sequence of words. For instance, there are 7 N-grams in the phrase "New York City", including "New", "York", "City", "New York", "New City", "York City" and "New York City". In the above example, the N-grams "New", "York", and "City" include a single word, and are thus called "unigrams". N-grams of two elements may be referred to as "bigrams"; N-grams of three elements may be referred to as "trigram"; and N-grams having greater than three elements may be referred to simply as "N-grams".

In this specification, the term "N-gram" is used to reference a unigram, bigram, trigram as well as N-grams having more than three elements.

The N-gram extractor 320 is operable to provide the N-grams to the vector generator 325, which assigns semantic weights to each N-gram and builds N-gram vectors for each of the first user query 310 and the second user query 315. The semantic weight assigned to each N-gram represents the uniqueness of an N-gram, which may identify the significance of that N-gram to identifying relevant documents responsive to a user's original query, e.g., the first user query 310 in FIG. 3. One method of assigning semantic weights to N-grams is described in greater detail below.

In some implementations, the suggestion/refinement module 305 is in communication with a semantic importance log 340, which stores a table or cache of semantic weights for each N-gram. The semantic weights are provided to the suggestion/refinement module 305 for use during the generation of the N-gram vectors, which are then used to execute similarity computations. The semantic importance log 340 may be initially generated by the suggestion/refinement module 305, a semantic importance generator (not illustrated) within the suggestion/refinement module 305, and/or by other system 100, 200 components. Additionally, the system 300 may periodically update and/or regenerate the semantic importance log 340.

The similarity determiner 330 receives the N-gram vectors created by the vector generator 325 corresponding to the first user query 310 and second user query 315 and uses those vectors to determine the similarity of the first user query 310 and second user query 315. The similarity determiner 330 determines the similarities of the two queries 310 by calculating the weighted sum over all similarities measurements between N-grams in the first query vector to the second query vector. If the second query is deemed similar to the first user query 310, the second query 315 is identified as a suggested query 335. In some implementations, the suggested query 335 may be provided to the user as a possible query the user may wish to enter. In other implementations, the suggested query 335 may be executed along with the user-entered query.

The N-gram extractor 320, vector generator 325, and similarity determiner 330 will be described in more detail below with reference to FIGS. 4-6. Although the present specification describes an example comparison of two queries, query suggestions may be based on the comparison of a large number of queries. For instance, the first user query 310 may be compared iteratively to a large number of queries stored in one or more databases or indexes 229.

Figure 4:
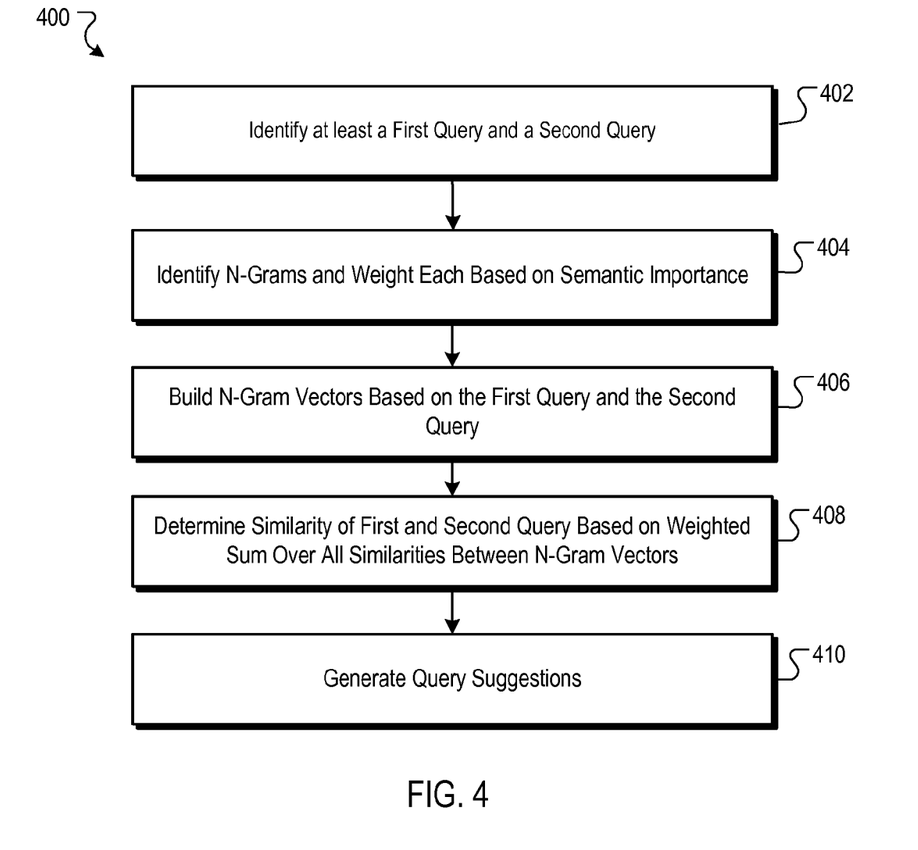
FIG. 4 shows a block diagram flow chart of an example query suggestion process.

FIG. 4 shows a block diagram flow chart of an example query suggestion process 400. At least two queries, such as an exemplary first query and second query, are identified 402. In some implementations, the first and second queries may represent queries received from one or more users, for instance, at an Internet search system such as Google.com and stored in a query log.

N-grams are identified for each of the first query and second query 404. In some implementations, certain non-core or 'soft' terms may be excluded from the N-grams. For instance, terms such as 'a', 'the', and the like, may be excluded as non-core terms and thus may not be included in N-grams. Weights for each N-gram are assigned based on the semantic importance of the N-grams 404. The assigning of weights to each N-gram may be completed by the N-gram extractor 320, vector generator 325, or suggestion/refinement module 305. In some implementations, the semantic importance log 340 provides the semantic weights of each N-gram to the suggestion/refinement module 305.

Next, N-gram vectors 405 are built for each of the first and second queries 406, and in particular, from the weighted N-grams. The building of N-gram vectors may be executed, for example, by the N-gram extractor 320. N-distinct words may be captured from a corpus of words within queries, where the N-distinct words represent an entire vocabulary that is represented in N-dimensional space. An N-gram is then represented as an N-gram vector in that space.

The similarity of the first and second queries is then determined, for example, by the similarity determiner 330, based on the weighted sum over all similarities between N-grams in the first query vector to the second query vector 408. The similarity measurement may be calculated as the cosine similarity between the vectors, which is the cosine of the angle between two vectors. Query suggestions are then generated 410, which may represent communication of a query suggestion to the user and/or execution of a suggested query.

Figure 5:
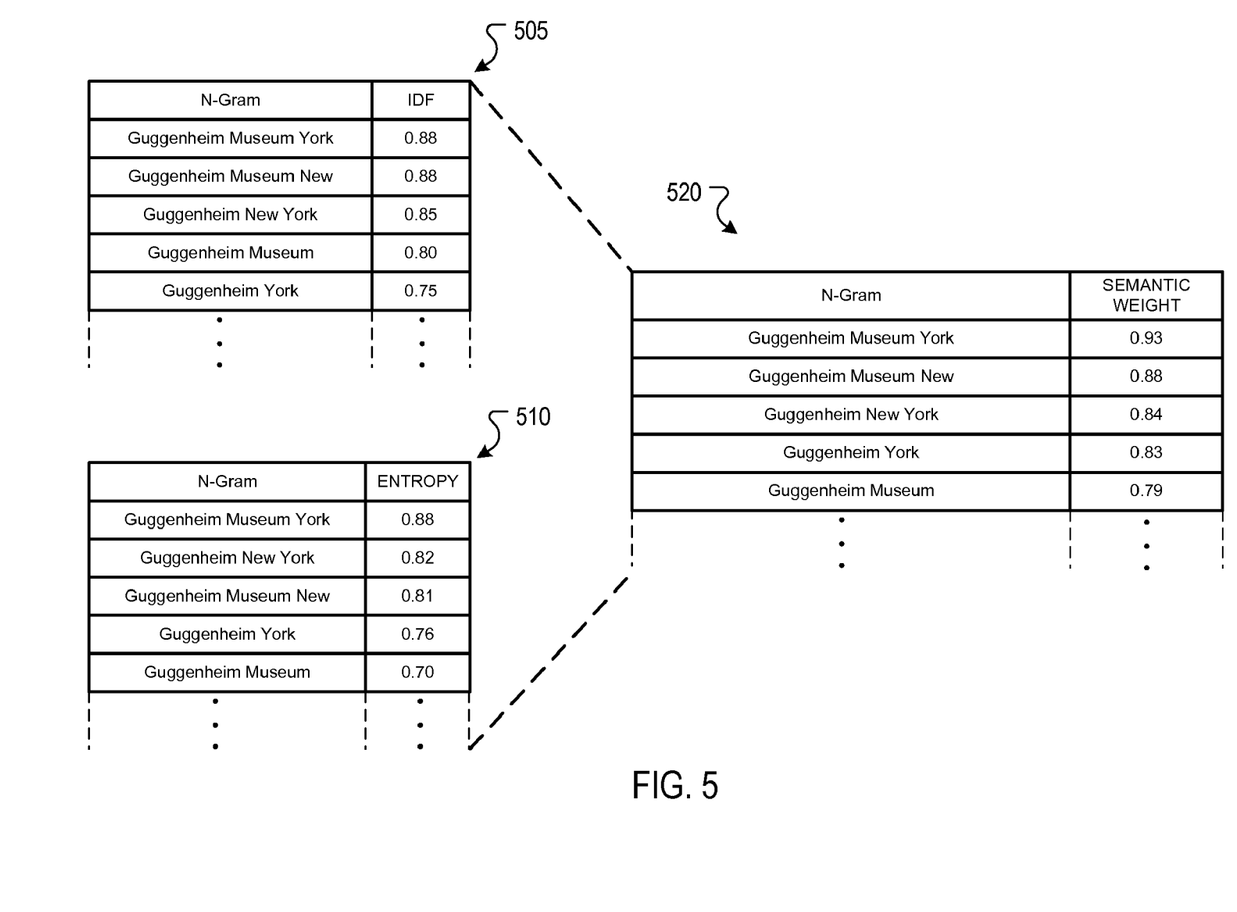
FIG. 5 shows an illustrative weight assignment table.

FIG. 5 shows an example semantic importance log 520 for N-grams constructed for the illustrative query "Guggenheim Museum New York". The semantic importance log 520 includes a semantic weight for each N-gram. The semantic weight is corresponds to the uniqueness of an N-gram. In some implementations, the more unique an N-gram is, the higher its semantic weight. As a corollary, the more general a term is, the lower its semantic weight. In some implementations, the distribution of terms in an entire query set may be compared against the frequency of the term to identify the semantic weight of a term.

In some implementations, the semantic importance value of the semantic importance log 520 can be calculated from one or more semantic components that quantify the semantic importance of N-grams of a query. The components may be generated automatically. In the example of FIG. 5, the semantic importance value for each N-gram is calculated from at least two components, including an inverse document frequency (IDF) 505 of the N-gram and the entropy 510 of the N-gram.

The IDF of an N-gram is a numerical value that identifies the degree to which terms in an N-gram are able to discriminate among documents in a corpus of documents. Although inverse document frequency is generally known, it is usually used only for determining document similarity. IDF is a technique that is described in "Introduction to Modern Information Retrieval", G. Salton et al., McGraw-Hill, 1983. IDF is used to identify potential hypertext links in a dynamic hypertext application in a system described in "What the Query Told the Link: The Integration of Hypertext and Information Retrieval", G. Golovchinsky, Proceedings of Hypertext '97, April 1997, South Hampton, U.K., ACM Press.

For instance, in FIG. 5, the N-gram "Guggenheim Museum York" has a higher IDF than the N-gram "Guggenheim York" because it appears in fewer documents compared to the latter term. This suggests that the term is more unique, and as a result, may be more useful in generating useful search results. For instance, the former, more unique term may identify a museum, whereas the latter term may identify a person and a museum. As a result, a search query (e.g., a suggested search query) that is similar to the term "Guggenheim Museum York" is more likely to yield useful search results to the user than a search query similar to the term "Guggenheim York".

The entropy of an N-gram determines the uniqueness of the N-gram in a group of previously known terms, such as in an index of previous search queries. The entropy of an N-gram having terms $w1, w2, \ldots, wN$ is:

$$h(w1, w2, w3, \ldots, wN) = -\text{Prob}(w1, w2, w3, \ldots, wN) \log \text{Prob}(w1, w2, w3, \ldots, wN), \text{ where}$$

$$\text{Prob}(w1, w2, \ldots, wN) = \text{Prob}(w1) * \text{Prob}(w2|w1) * \text{Prob}(w3|w1, w2) * \ldots * \text{Prob}(wN|w1, w2, \ldots wN-1)$$

The Prob(wN|w1, ..., wN−1) is roughly approximated by Prob(wN|wN−1), i.e., the conditional probability of a term (e.g., a word) given a previous term. The above probabilities can be estimated from a base volume of training data, e.g., comprised of a list of search queries. For some N-grams a Katz backoff smoothing method can be used to estimate the probabilities that a term (e.g., a word) will occur given a previous term. The Katz backoff method may be desirable where the statistics of an N-gram from the training corpus is imprecise or unavailable. This may occur, for instance, if the volume of training data is insufficient.

The semantic weight can be based on a combination (i.e., can be a function of) components such as the IDF and entropy of each N-gram. In some implementations, the components may be weighted in determining the semantic weight of an N-gram. For example, the semantic weight may be based on 60% of the value of the IDF, and 40% of the value of the entropy. Any combination of weights may be used. It will be appreciated that the actual semantic weight values for N-grams are arbitrary so long as each N-gram is calculated in the same manner, using the same calculations for each component. Thus, where IDF and entropy are each calculated in a consistent manner, the actual value ranges for each, and the determined semantic weight values, may be any range of values. Additionally, although semantic weights with higher values are deemed more 'unique', semantic measurements may be made such that the lower the semantic weight, the more unique an N-gram is. For instance, the semantic weights illustrated in FIG. 5 may be subtracted from one (1) to yield weights where a lower number represents a more unique N-gram.

Figure 6:
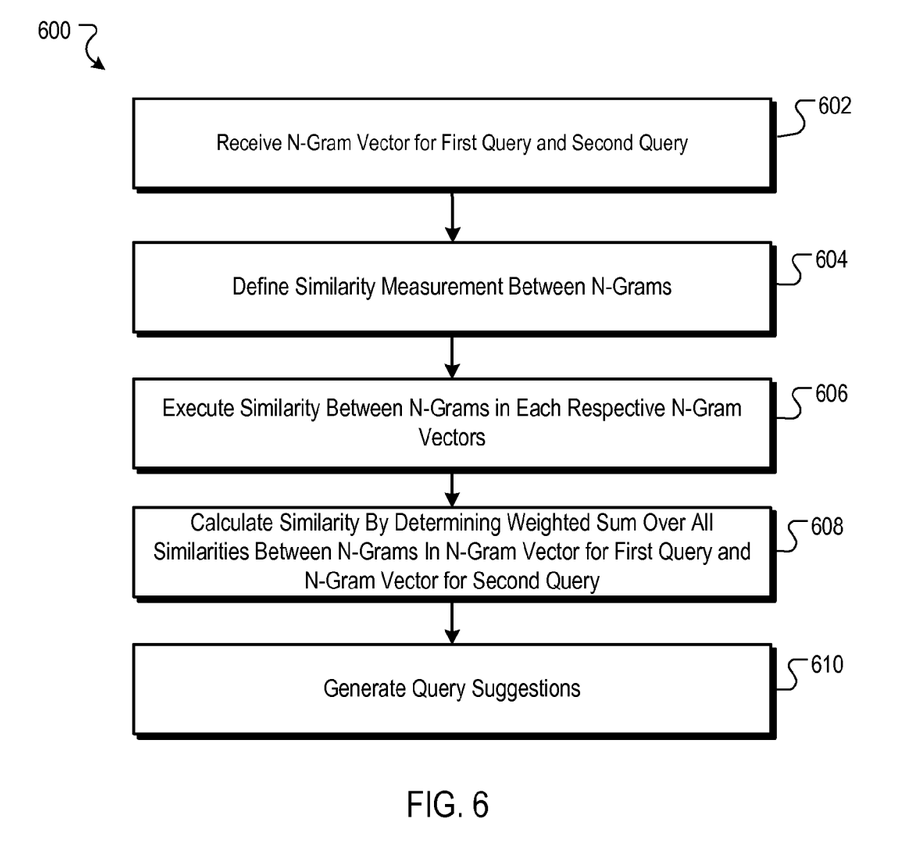
FIG. 6 is a block diagram flow chart of a similarity measurement process.

FIG. 6 is a block diagram flow chart of a similarity measurement process that occurs subsequent to the building of N-gram vectors, for example, by the N-gram extractor 320. In some implementations, the similarity measurement process is executed by the similarity determiner 330 for determining the similarity of a first to a second query.

As shown in FIG. 6, a similarity measurement for two vectors V_A=<v_a_1, v_a_2, . . . , v_a_m> and V_B=<v_b_1, v_b_2, . . . , v_b_n> is received, where V_A represents the N-gram vector for a first search query, and V_B represents the N-gram vector for a second search query 602. In some implementations, the N-gram vectors are generated by the vector generator 325.

A similarity measurement is defined and executed between the N-grams in each vector 604, 606. The similarity measurement D(v_a_i, V_B) is defined between the N-gram v_a_i in V_A and V_B, and the similarity D(v_b_j, V_A) is defined between the N-gram v_b_j in V_B to V_A. For example, where three N-grams exist in a first query (e.g., a search query having three terms), and three N-grams exist in a second query, each of the N-grams in the first query are compared from V_A to V_B, and each of the N-grams in the second query are compared from V_B to V-A. The similarity of the first search query ('A') and the second search query ('B') is determined as the weighted sum over all similarities between N-grams in one query vector to the other 608:

$$\text{Sim}(V\_A, V\_B) = \sum_{i=1}^{m} \text{weight}(v\_a\_i) * D(v\_a\_i, V\_B) + \sum_{j=1}^{n} \text{weight}(v\_b\_j) * D(v\_a\_j, V\_A)$$

Query suggestions are then generated 610, which may represent communication of a query suggestion to the user and/or execution of a suggested query. In some implementations, suggestions are generated if the similarity between vectors V_A and V_B is greater than a threshold.

The systems, apparatus, and methods described in this specification may be implemented in computer processing systems including program code including program instructions that are executable by the computer processing system, which may be made up of one or more computers at one or more locations. Other implementations may also be used.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    generating a first vector for one or more first n-grams of a first query and calculating a respective first semantic weight for each of the first n-grams based at least in part on an entropy of the particular first n-gram in which the entropy is estimated from a set of search queries;
    generating a second vector for one or more second n-grams of a second query and calculating a respective second semantic weight for each of the second n-grams;
    calculating a similarity measurement between the first query and the second query based on respective similarities of semantically weighted first n-grams to the second vector, and based on respective similarities of the semantically weighted second n-grams to the first vector; and
    wherein generating and calculating are performed by one or more computers.

2. The method of claim 1 in which calculating the first semantic weight for the first n-gram is based at least in part on an inverse document frequency (IDF) of the first n-gram.

3. The method of claim 1, in which calculating the first semantic weight for the first n-gram is based on a combination of an inverse document frequency (IDF) of the first n-gram and an entropy of the first n-gram.

4. The method of claim 1, further comprising comparing the similarity measurement to a threshold.

5. The method of claim 4, further comprising determining that the first query and the second query are similar when the similarity measurement exceeds the threshold.

6. The method of claim 5, further comprising:
    providing the second query as a query suggestion for the first query.

7. A system comprising:
    one or more servers configured to perform operations comprising:
    generating a first vector for one or more first n-grams of a first query and calculating a respective first semantic weight for each of the first n-grams based at least in part on an entropy of the particular first n-gram in which the entropy is estimated from a set of search queries;
    generating a second vector for one or more second n-grams of a second query and calculating a respective second semantic weight for each of the second n-grams;
    calculating a similarity measurement between the first query and the second query based on respective similarities of semantically weighted first n-grams to the second vector, and based on respective similarities of the semantically weighted second n-grams to the first vector; and wherein generating and calculating are performed by one or more computers.

8. The system of claim 7, in which calculating the first semantic weight for the first n-gram is based at least in part on an inverse document frequency (IDF) of the first n-gram.

9. The system of claim 7, in which calculating the first semantic weight for the first n-gram is based on a combination of an inverse document frequency (IDF) of the first n-gram and an entropy of the first n-gram.

10. The system of claim 7, wherein the operations further comprise comparing the similarity measurement to a threshold.

11. The system of claim 10, wherein the operations further comprise determining that the first query and the second query are similar when the similarity measurement exceeds the threshold.

12. The system of claim 7, wherein the operations further comprise providing the second query as a query suggestion for the first query.

13. A computer program product encoded on a storage device, the computer program product including instructions which when executed by a processor cause the processor to perform operations comprising:

generating a first vector for one or more first n-grams of a first query and calculating a respective first semantic weight for each of the first n-grams based at least in part on an entropy of the particular first n-gram in which the entropy is estimated from a set of search queries;

generating a second vector for one or more second n-grams of a second query and calculating a respective second semantic weight for each of the second n-grams; and calculating a similarity measurement between the first query and the second query based on respective similarities of semantically weighted first n-grams to the second vector, and based on respective similarities of the semantically weighted second n-grams to the first vector.

14. The program product of claim 13, in which calculating the first semantic weight for the first n-gram is based at least in part on an inverse document frequency (IDF) of the first n-gram.

15. The program product of claim 13, in which calculating the first semantic weight for the first n-gram is based on a combination of an inverse document frequency (IDF) of the first n-gram and an entropy of the first n-gram.

16. The program product of claim 13, wherein the operations further comprise comparing the similarity measurement to a threshold.

17. The program product of claim 16, wherein the operations further comprise determining that the first query and the second query are similar when the similarity measurement exceeds the threshold.

18. The program product of claim 13, wherein the operations further comprise providing the second query as a query suggestion for the first query.

19. The method of claim 1, further comprising:

providing the second query as a query suggestion for the first query.

\* \* \* \* \*